US010155276B2

(12) United States Patent
Kawamoto et al.

(10) Patent No.: US 10,155,276 B2
(45) Date of Patent: Dec. 18, 2018

(54) METHOD OF WELDING SURFACE-TREATED MEMBERS USING A WELDING WIRE

(71) Applicant: Panasonic Intellectual Property Management Co., Ltd., Osaka (JP)

(72) Inventors: Atsuhiro Kawamoto, Hyogo (JP); Yasushi Mukai, Osaka (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 14/220,597

(22) Filed: Mar. 20, 2014

(65) Prior Publication Data
US 2014/0202993 A1 Jul. 24, 2014

Related U.S. Application Data

(63) Continuation of application No. PCT/JP2012/006292, filed on Oct. 2, 2012.

(30) Foreign Application Priority Data

Mar. 7, 2012 (JP) .................................. 2012-050058

(51) Int. Cl.
*B23K 9/09* (2006.01)
*B23K 9/073* (2006.01)
(Continued)

(52) U.S. Cl.
CPC .............. *B23K 9/093* (2013.01); *B23K 9/025* (2013.01); *B23K 9/073* (2013.01); *B23K 9/08* (2013.01);
(Continued)

(58) Field of Classification Search
CPC .......... B23K 9/093; B23K 9/08; B23K 9/125; B23K 9/173; B23K 9/1043
(Continued)

(56) References Cited

U.S. PATENT DOCUMENTS 3,781,511 A * 12/1973 Rygiol ................... B23K 9/092
219/130.32
4,904,843 A * 2/1990 Hori ...................... B23K 9/1093
219/130.51
(Continued)

FOREIGN PATENT DOCUMENTS

CN 101920376 12/2010
CN 102264500 11/2011
(Continued)

OTHER PUBLICATIONS

The Extended European Search Report dated May 7, 2015 for the related European Patent Application No. 12870708.0.
(Continued)

*Primary Examiner* — Tu B Hoang
*Assistant Examiner* — Alba Rosario-Aponte
(74) *Attorney, Agent, or Firm* — Wenderoth, Lind & Ponack, L.L.P.

(57) ABSTRACT

A method of welding surface-treated members together using a welding wire includes a step of transferring a droplet detached from the wire to the members; and a step of pushing the melt pool in the direction opposite to the direction of welding in such a manner that the gas generated from the members during welding is released from the site of generation. The melt pool is pushed to expose the overlapped region of these members. The gas generated from the members is released to the exposed portion, preventing generation of pores such as blowholes, and also generation of spatters.

19 Claims, 6 Drawing Sheets

(51) Int. Cl.
*B23K 9/08* (2006.01)
*B23K 9/095* (2006.01)
*B23K 9/025* (2006.01)
*B23K 9/23* (2006.01)
*B23K 9/10* (2006.01)
*B23K 9/12* (2006.01)
*B23K 9/173* (2006.01)
*B23K 101/18* (2006.01)
*B23K 101/34* (2006.01)
*B23K 103/04* (2006.01)

(52) U.S. Cl.
CPC ............... *B23K 9/09* (2013.01); *B23K 9/095* (2013.01); *B23K 9/1043* (2013.01); *B23K 9/125* (2013.01); *B23K 9/173* (2013.01); *B23K 9/23* (2013.01); *B23K 2101/18* (2018.08); *B23K 2101/34* (2018.08); *B23K 2103/04* (2018.08)

(58) Field of Classification Search
USPC .................. 219/74, 130.51, 123, 137.71
See application file for complete search history.

(56) References Cited

U.S. PATENT DOCUMENTS

| | | |
|---|---|---|
| 5,473,139 A | 12/1995 | Matsui et al. |
| 5,525,778 A | 6/1996 | Matsui et al. |
| 5,800,911 A | 9/1998 | Sankey et al. |
| 2007/0210048 A1 | 9/2007 | Koshiishi et al. |
| 2008/0314884 A1 | 12/2008 | Fujiwara et al. |
| 2011/0174784 A1 | 7/2011 | Kamei |
| 2012/0097654 A1 | 4/2012 | Kawamoto et al. |

FOREIGN PATENT DOCUMENTS

| | | | |
|---|---|---|---|
| EP | 2338628 | | 6/2011 |
| JP | 53-140249 | A | 12/1978 |
| JP | S60-130469 | A | 7/1985 |
| JP | S63-144875 | A | 6/1988 |
| JP | 64-048678 | | 2/1989 |
| JP | 64-048678 | A | 2/1989 |
| JP | 5-329682 | | 12/1993 |
| JP | 6-285643 | A | 10/1994 |
| JP | 06-285643 | A | 10/1994 |
| JP | 08-309533 | A | 11/1996 |
| JP | 11-090629 | | 4/1999 |
| JP | 11-090629 | A | 4/1999 |
| JP | 2007050426 | A * | 3/2007 |
| JP | 2007-098459 | A | 4/2007 |
| JP | 2007-216268 | A | 8/2007 |
| JP | 2007-237270 | A | 9/2007 |
| JP | 2010-082641 | A | 4/2010 |
| JP | 2011-098375 | A | 5/2011 |
| JP | 2011-131243 | A | 7/2011 |

OTHER PUBLICATIONS

International Search Report for PCT/JP2012/006292 dated Nov. 20, 2012.
English Translation of Chinese Search Report dated Jul. 29, 2015 for the related Chinese Patent Application No. 201280055003.4.
Communication pursuant to Article 94(3) EPC dated Jun. 13, 2016 for the related European Patent Application No. 12870708.0.
Magda A et al., "Possibilities of joining galvanized sheet steel using the CMT method (cold metal transfer)", Welding International, Taylor & Francis, Abingdon, GB, vol. 27, No. 7-9, Jul. 1, 2013 (Jul. 1, 2013), pp. 665-667, XP001585404.
Extended European Search Report dated Jan. 25, 2017 in corresponding European Patent Application No. 12870708.0.

* cited by examiner

METHOD OF WELDING SURFACE-TREATED MEMBERS USING A WELDING WIRE

BACKGROUND

1. Technical Field

The present invention relates to a method of arc welding using a welding wire, which is a consumable electrode.

2. Background Art

General welding processes used to weld two zinc coated steel sheets together include short-circuit transfer welding (such as $CO_2$ welding and MAO welding) and pulse MAO welding. FIGS. 6, 7A, and 7B show a conventional method of arc welding in the case of welding two zinc coated steel sheets together. FIG. 6 is a sectional view of a bead formed when two zinc coated steel sheets are welded together by general consumable electrode arc welding. FIGS. 7A and 7B show a conventional method of arc welding; FIG. 7A shows changes in welding current with time, and FIG. 7B shows changes in wire feed speed with time.

Zinc coated steel sheet 103 and zinc coated steel sheet 104 have zinc plating 110 on their surfaces. Zinc has a boiling point of 907 degree Celsius, which is lower than the melting point of iron (1536 degrees Celsius). Consequently, when zinc coated steel sheets 103 and 104 are arc welded together, the zinc vaporizes and the vaporized zinc (hereinafter, "zinc vapor") tries to diffuse to the outside through the melt pool. When however, the molten metal has a high rate of solidification, the zinc vapor is not completely diffused outside, and remains as pores 120 inside and on the surface of weld bead 107. Pores 120 are referred to as blowholes when remaining inside weld bead 107 and as pits when opening in the surface weld bead 107. Since these blowholes and pits degrade the strength of the welded joint, it is essential to suppress their generation, for example, in the automotive industry which uses a large number of zinc coated steel sheets. Pit generation, in particular, is often specified and controlled.

As shown in FIGS. 7A and 7B, assume that pulse welding is performed using either Ar (argon) or a mixture gas of Ar and 25% or less of carbon dioxide. In this case, it is known to use a method of arc welding as shown in FIG. 7A (see, for example, Japanese Unexamined Patent Publication H06-285643). In FIG. 7A, a welding current Aw is applied for a waving period TW consisting of a first period TL and a second period TH in one cycle, and a wire is fed at a wire feed speed Wf shown in FIG. 7B. As shown in FIG. 7A, in the waving period TW, the first period TL has a current waveform where a first average arc force FL acts on the melt pool. In the first, period TL, a peak current IL is fed for a duration tL at a pulse period TP. The second period TH has a current waveform where a second average arc. force FH larger than the first average arc force FL acts on the melt pool. In the second period TH, a peak current IH is fed for a duration tH at the pulse period TP. The waving frequency TW in this case fluctuates in the range of 10 Hz to 50 Hz.

An arc force acts to push down the melt pool. Therefore, when an arc force fluctuates between the first average arc force FL and the second average arc force FH, the melt pool ripples. When the melt pool is rippling, pores 12 generated in the zinc-plated layer reach the surface of the melt pool due to their buoyancy and the flow of the melt pool, thereby being released to the outside of the melt pool.

The conventional method of arc welding described above with reference to FIGS. 7A and 7B shows the analysis to reduce blowholes and the results as an Example with zinc coated steel sheets having a thickness of 1.6 mm and a zinc weight of 45 $g/m^2$. The main purpose, of this method, however, is to vibrate the melt pool, and it is impossible to move the melt pool to an extent to expose root area 121 (shown in FIG. 6) where the steel sheets are overlapped with each other. Consequently, when the sheet thickness is 2.0 mm or more, the required penetration increases, causing an increase in the thickness of the melt pool, and making it difficult to release the zinc vapor. When two welding zinc coated steel sheets having a zinc weight larger than 45 $g/m^2$ are welded together, the amount of zinc vapor itself increases. The zinc vapor remains in weld bead 107, causing an increase in the generation of pores 120.

When the zinc vapor comes up from the melt pool and is released through the surface of the pool, the molten metal may spatter to the outside directly. The molten metal spouted by a release of zinc vapor may also be short-circuited to the wire to generate electric energy, which causes the molten metal to scatter, resulting in an abnormally large number of spatters.

SUMMARY

The present invention provides a welding method that prevents generation of pores such as blowholes, and also generation of spatters.

The method of welding surface-treated members together using a welding wire according to the present invention includes a step of transferring a droplet detached from the wire to the members; and a step of welding the members together by pushing the melt pool in the direction opposite to the direction of welding in such a manner that the gas generated from the members is released from the site of generation.

In this method, the melt pool is pushed to expose the overlapped region of these members, and the gas generated from the members is released from the exposed portion, which is the overlapped region of these members. This suppresses generation of pores such as blowholes and also generation of spatters.

DESCRIPTION OF EMBODIMENT

Figure 1:
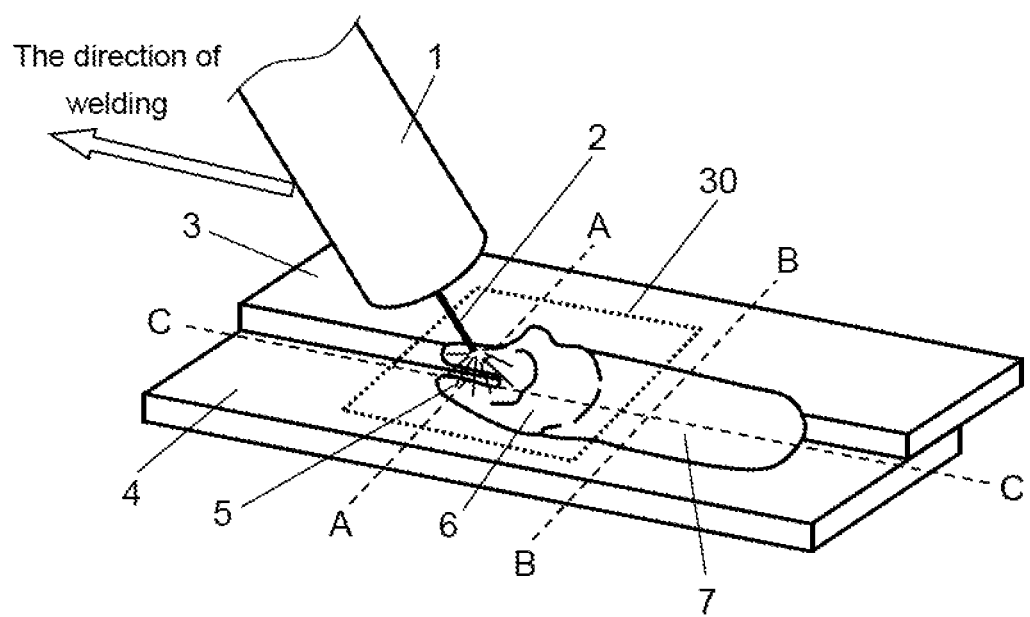
FIG. 1 is a perspective view showing a welding method according to a first exemplary embodiment of the present invention.

An exemplary embodiment of the present invention will now be described with reference to drawings. In these drawings, the same reference numerals are used for the same components, and the description thereof may be omitted.

First Exemplary Embodiment

Figure 2A:
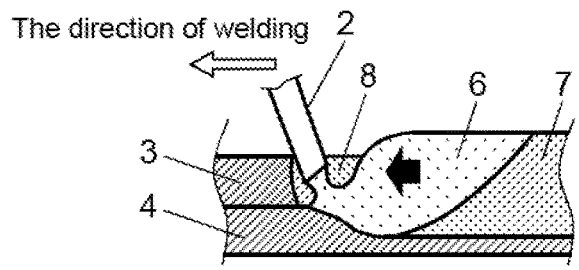
FIG. 2A is a vertical sectional view of a part to be welded in a short circuit, period in the first exemplary embodiment of the present invention.
Figure 2B:
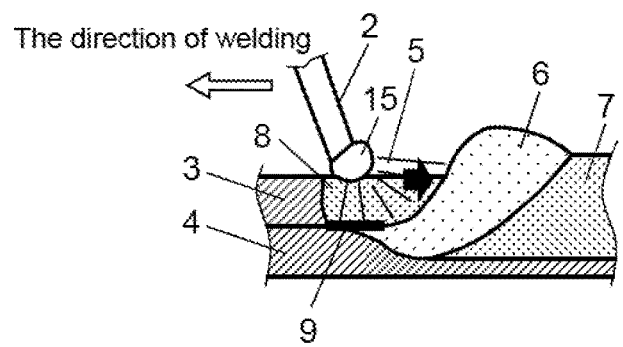
FIG. 2B is a vertical sectional view of the part to be welded in an arc period in the first exemplary embodiment of the present invention.
Figure 2C:
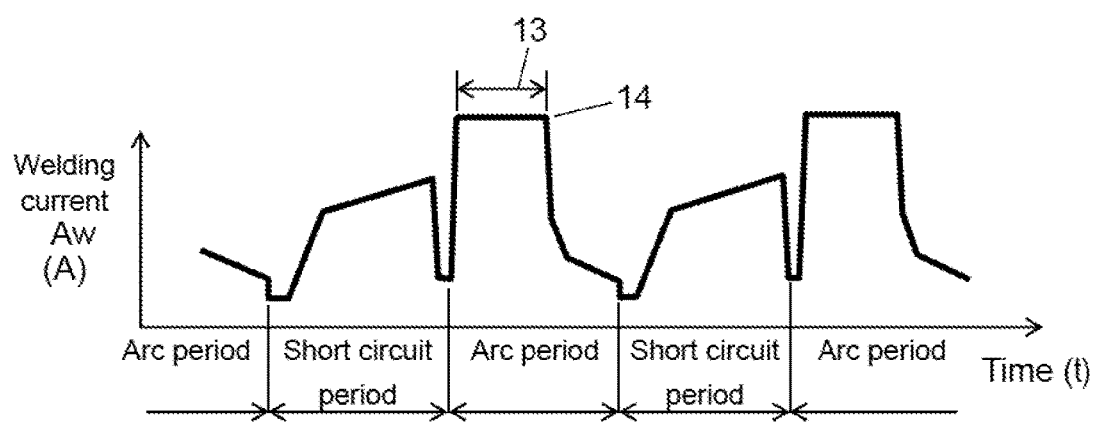
FIG. 2C shows a time waveform of welding current in the first exemplary embodiment of the present invention.

FIG. 1 is a perspective view showing a method of arc welding as a welding method according to the first exemplary embodiment of the present invention. FIG. 2A is a horizontal sectional view (taken along the line C-C of FIG. 1) of part 30 to be welded in a short circuit period in the first exemplary embodiment of the present invention. FIG. 2B is a horizontal sectional view (taken along the line C-C of FIG. 1) of part 30 to be welded in an arc period in the first exemplary embodiment of the present invention. FIG. 2C shows a time waveform of welding current when welding is performed by the method of arc welding according to the first exemplary embodiment of the present invention. The short circuit period shown in FIG. 2A and the arc period shown in FIG. 2B are related to the time waveform of the welding current shown in FIG. 2C. In the present first exemplary embodiment, zinc coated steel sheets are taken as an example of surface-treated members to be welded.

Figure 3:
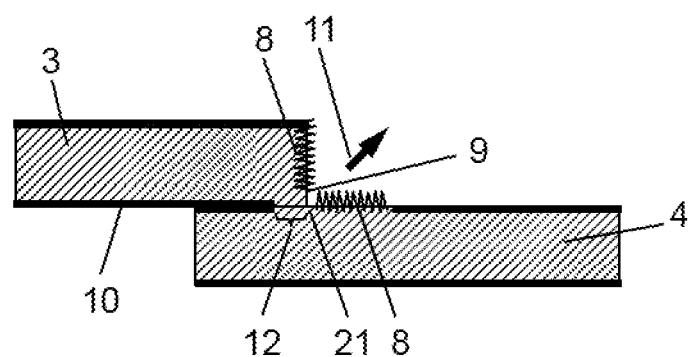
FIG. 3 is a cross sectional view taken along the line A-A of FIG. 1 in the first exemplary embodiment of the present. invention.
Figure 4:
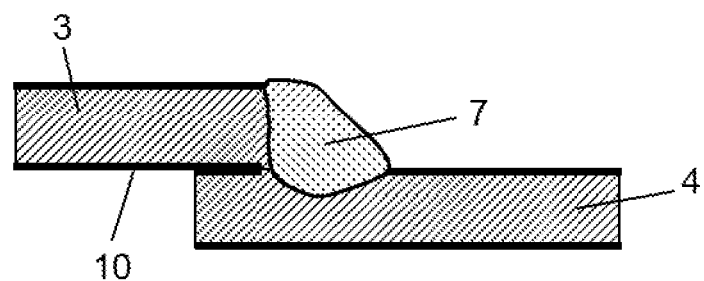
FIG. 4 is a cross sectional view taken along the line B-B of FIG. 1 in the first exemplary embodiment of the present invention.
Figure 5:
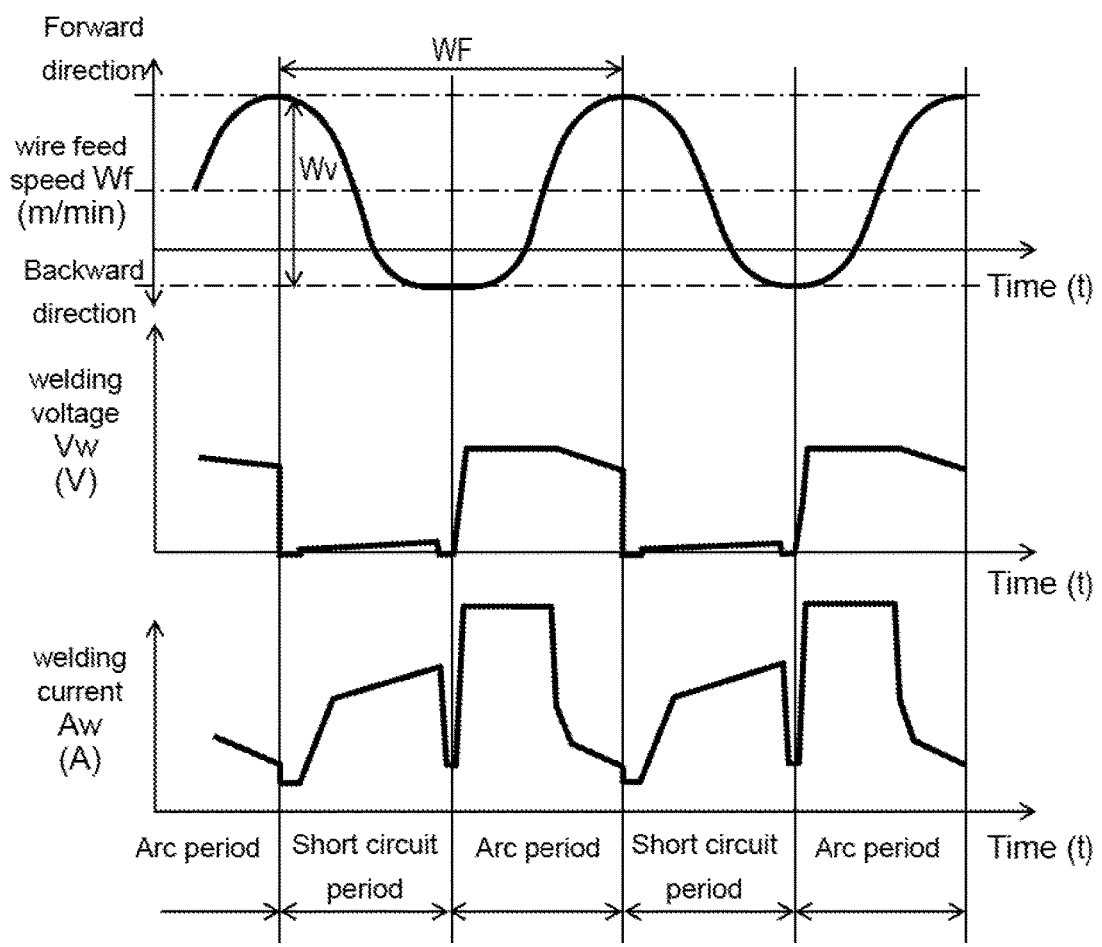
FIG. 5 shows changes in wire feed speed, welding voltage, and welding current with time in the first exemplary embodiment of the present invention.
Figure 6:
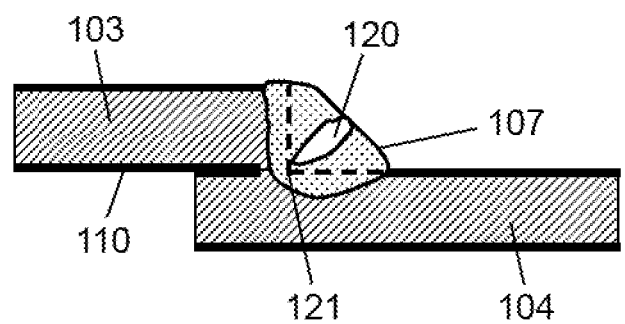
FIG. 6 is a sectional view of a weld head when two zinc coated steel sheets are welded together by a conventional method of arc welding.
Figure 7A:
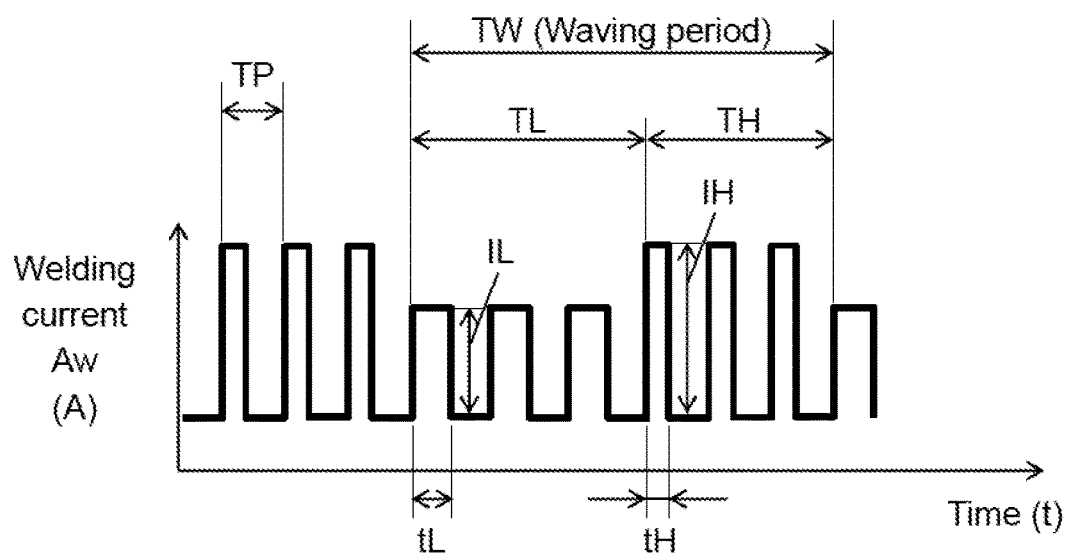
FIG. 7A shows changes in welding current with time in the conventional method of arc welding.
Figure 7B:
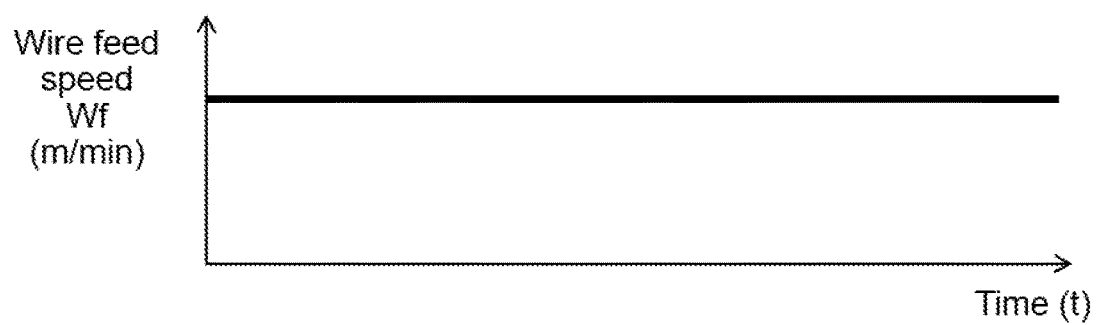
FIG. 7B shows changes in wire feed speed with time in the conventional method of arc welding.

FIG. 3 is a cross sectional view taken along the line A-A of FIG. 1 in the first exemplary embodiment of the present invention. FIG. 4 is a cross sectional view taken along the line B-B of FIG. 1 in the first exemplary embodiment of the present invention. FIG. 5 shows changes in wire feed speed, welding voltage, and welding current with time in the first exemplary embodiment of the present invention.

In FIG. 1, an unillustrated wire feeding device automatically feeds welding wire 2 via welding torch I attached, for example, to the manipulator of an industrial robot. While the wire feeding device is feeding wire 2, an unillustrated welding device supplies electric power to wire 2 so as to create arc 5 between wire 2 and two zinc coated steel. sheets, i.e., upper plate 3 and lower plate 4. Wire 2 and upper and lower plates 3, 4 are melted and welded together.

As shown in FIG. 2A, wire 2 being fed is short-circuited to melt pool 6. During this time, arc 5 is lost and there is no generation of arc force which is supposed to account for most part of the force to push melt pool 6. This short-circuit state corresponds to the short circuit period in the time waveform of the welding current Aw shown in FIG. 2C.

In this short circuit period, in order to transfer the short-circuited portion at the tip of wire 2 to melt pool 6 so as to create an arc early, the welding current is increased and electric energy is supplied to melt the tip of wire 2. After this, when the short circuit opens and arc 5 occurs, the welding current is further increased to output first welding current 14 during first predetermined period 13 as shown in FIG. 2C. In this case, the force of arc 5 generated by the high welding current acts to push melt pool 6 in the direction opposite to the direction of welding as shown in FIG. 2B. As a result, melt pool 6 is pushed in the direction opposite to the direction of welding, thereby exposing root area 21 where upper and lower plates 3 and 4 are overlapped with each other as shown in FIG. 3, The exposed root area 21 is shown as exposed portion 9 in FIG. 2B.

Part 30 to be welded is heated to a high temperature by arc heat. and heat conduction from melt pool 6. Upper and lower plates 3 and 4 are melted to generate molten section 8 as shown in FIG. 3. The zinc on the surfaces of upper and lower plates 3 and 4 exceeds its boiling point and vaporizes. After this, as shown in FIGS. 1 and 2B, melt pool 6 is pushed in the direction opposite to the direction of welding, thereby exposing root area 21 where upper and lower plates 3 and 4 are overlapped with each other as shown in FIG. 3. This allows the vaporized zinc (hereinafter, zinc vapor 11) to be easily released to the outside. As shown in FIG. 3, this results in the formation of zinc-plating vaporized portion 12 from which the zinc on the surface of zinc plating 10 has vaporized, and which contains no zinc any more. No zinc is left in the form of gas in molten section 8, and as a result, weld bead 7 shown in FIG. 4 contains no pores.

When exposed portion 9 shown in FIGS. 2B and 3 is completely exposed due to the force of arc 5, zinc vapor 11 can be easily released without causing the generation of spatters. In FIG. 2B, even if part of each of molten section 8 and melt, pool 6 covers exposed portion 9, this does not disturb the release of zinc vapor 11 as long as the thickness the covering is about 0.5 mm or less. As a result, root area 21 is easily exposed due to the volume expansion of zinc vapor 11, which is easily released to the outside. Thus, melt pool 6 may be pushed by the force of arc 5 in such a manner as to have a thickness sufficient to allow zinc vapor 11 generated from upper and lower plates 3 and 4 to break through molten section 8 and melt pool 6, which cover exposed portion 9 when zinc vapor 11 is expanded in volume. As a result, as shown in FIG. 2B, part of molten section 8 alone covers exposed portion 9, or the upper part of exposed portion 9 is exposed, allowing zinc vapor 11 to be released either directly or after breaking through the part of the molten section 8. In the absence of the force of arc 5, on the other hand, as shown in FIG. 2A, melt pool 6 covers the region which is to become exposed portion 9, or melt pool 6 reaches and covers part of the region which is to become exposed portion 9. In this case, zinc vapor 11 is not released entirely; at least part of it remains in melt pool 6.

When the arc period is over, wire 2 is fed toward melt pool 6 so as to return from the state shown in FIG. 2B to the state shown in FIG. 2A, which is the above-described short-circuit state. At this moment, there is no are force to push melt pool 6, and melt pool 6 moves in the direction of welding from the state shown in FIG. 2B, which is an arc period. In the arc period, melt pool 6 is pushed by the arc force in the direction opposite to the direction of welding, thereby exposing root area 21 heated to a high temperature by arc heat and heat conduction from melt pool 6. As a result, zinc vapor 11 is easily released to the outside from exposed portion 9. This facilitates the release of vaporized zinc including zinc vapor 11 to the outside, decreasing the amount of vaporized zinc released thorough melt pool 6. Consequently, the number of pores left in weld bead 7 is greatly reduced.

The welding method of the present first exemplary embodiment is a method of welding surface-treated members using welding wire 2. The welding method of the present first exemplary embodiment includes a step of transferring droplet 15 detached from wire 2 to the members, and a step of welding the members together by pushing melt pool 6 in the direction opposite to the direction of welding in such a manner that the gas generated from the members is released from the site of generation. In this method, melt pool 6 is pushed to expose the overlapped region of these members, and the gas generated from the members is released from exposed portion 9, which is the overlapped region of these members. This suppresses generation of pores such as blowholes and also generation of spatters.

In the step of welding the members together, the members may be overlapped with each other, and the melt pool may be pushed to expose the overlapped region of the members. In this method, the gas generated from the members is released from exposed portion 9, which is the overlapped region of the members. This suppresses generation of pores such as blowholes and also generation of spatters.

If part of each of molten section 8 and melt pool 6 covers exposed portion 9, preventing root area 21 from being exposed in spite of the force of arc 5, the arc force is controlled so that the thickness of melt pool 6 can be less than 0.5 mm or so. More specifically, in the step of welding the members together, the members may be overlapped with each other, and melt pool 6 may be pushed in such a manner that a portion of melt pool 6 which is located above the overlapped region of these members has a thickness sufficient to allow the gas generated from the members to expand and break through melt pool 6, thereby being released from the site of generation. This method greatly suppresses spatters of molten metal which are generated when expanded zinc vapor 11 is pushing up melt pool 6 and when the molten metal is short-circuited to wire 2.

First welding current 14 shown in FIG. 2C may be supplied to generate an arc force for pushing melt pool 6. The main force to push melt pool 6 is the arc force generated by the welding current in the arc period. As shown in FIG. 2C, in the arc period, melt pool 6 is pushed by first welding current 14 during first predetermined period 13, and then the welding current is decreased to reduce or nullify the force to push melt pool 6 in the remaining time of the arc period so that melt pool 6 can be early started to move in the direction of welding.

First welding current 14 may be kept constant during first predetermined period 13. In this method, melt pool 6 is pushed by a constant arc force in the predetermined period in the arc period, thereby facilitating the release of zinc vapor 11. This suppresses generation of pores such as blowholes and also generation of spatters.

Thus, during first predetermined period 13 which starts with the transfer of droplet 15 and ends with the next transfer of droplet 15, melt pool 6 may be pushed in the direction opposite to the direction of welding. After first predetermined period 13, the force to push melt pool 6 may be reduced or nullified. This hastens the contact between melt pool 6 moved or returned to the direction of welding and wire 2, thereby generating the next short circuit early. Reducing the arc force in the arc period smoothens the short-circuit transfer, thereby improving the welding stability. In addition, the low welding current ensures occurrence of a short circuit, thereby suppressing generation of spatters.

Droplet 15 may have a transfer mode either consisting of an alternation of drop transfer and short-circuit transfer, or consisting mainly of short-circuit transfer. In this method, melt pool 6 can be pushed by the arc force after droplet 15 is transferred in either transfer mode, thereby facilitating the release of zinc vapor 11.

First welding current 14 output to push melt pool 6 during first predetermined period 13 as shown in FIG. 2C may have a predetermined value in the range of 300 A to 600 A. First predetermined period 13 may last from 2 msec to 10 msec. These values concerning first welding current 14 have been experimentally determined, and first welding current 14 plays roles in pushing melt pool 6 as the arc force and in melting the zinc.

First welding current 14 may be output in the range of 300 A to 600 A during first predetermined period 13 which may last from 2 msec to 10 msec in the arc period. In this method, the zinc is properly melted and melt pool 6 is pushed by a generated arc force, thereby facilitating the release of zinc vapor 11. This suppresses generation of pores such as blowholes and also generation of spatters.

When first welding current 14 has a low value, and first predetermined period 13 is short, melt pool 6 cannot be pushed far enough to form exposed portion 9. As a result, vaporization of the zinc cannot be accelerated, thereby causing the pores to tend to remain in weld bead 7. When, on the other hand, first welding current 14 has a high value, and first predetermined period 13 is long, vaporization of the zinc can be accelerated. Melt pool 6, however, is pushed so far that it is overflown. This causes the molten metal to spatter outside, thereby failing to form normal weld bead 7.

FIG. 2C shows first welding current 14 having a fixed value; alternatively, however, it may increase or decrease gradually within the range of 300 A to 600 A. For example, first welding current 14 may be output in the form of a saw-tooth wave.

FIG. 2C shows an increase slope at which the welding current increases rapidly per unit time until reaching first welding current 14 after the short circuit opens. Alternatively, however, the increase slope can be gentler. When, for example, the shielding gas is carbon dioxide gas (hereinafter, $CO_2$ gas), it is preferable that the increase slope be made gentler than in the case of using MAG gas. The reason for this is that $CO_2$ gas provides a higher convergence of arc 5, thereby providing a stronger arc force. Making the increase slope gentler can adjust the arc force so as to properly push melt pool 6, thereby facilitating the release of zinc vapor 11. This suppresses generation of pores such as blowholes and also generation of spatters. In the case of using as the shielding gas a mixture gas containing $CO_2$ gas, it is preferable that the increase slope of the welding current be made gentler with increasing $CO_2$ content.

In the above description, melt pool 6 is pushed in the direction opposite to the direction of welding by using the force of arc 5. However, melt pool 6 may alternatively be pushed by being supplied with a gas different from the shielding gas for welding. For example, a gas of the same quality as the shielding gas can be supplied as a different gas flow through a gas supply tube disposed behind the nozzle of torch 1. First welding current 14 has an important role in supplying melting energy to the tip of wire 2, besides providing the force to push melt, pool 6. Therefore, in an arc period, the welding current, especially first welding current 14 is required to satisfy both roles to provide the force to push melt pool 6 and to melt wire 2. When, however, another gas flow is used to push melt pool 6, first welding current 14 can be set mainly as melting energy to be supplied to the tip of wire 2, thereby increasing a degree of freedom in quantitatively setting the melting energy. As a result, the amount of the melting energy can be changed depending on the welding conditions such as welding material and the shape of molten section 8, thereby improving the welding performance. Alternatively, however, melt pool 6 may be pushed by both the arc force and the gas flow.

Further alternatively, melt pool 6 may be pushed by generating a magnetic field by a magnetic coil disposed behind the nozzle of torch 1, and deflecting arc 5 in the direction opposite to the direction of welding.

In this method, melt pool 6 is pushed to expose the overlapped region of these members, and the gas generated from the members is released from exposed portion 9, which is the overlapped region of these members. This suppresses generation of pores such as blowholes and also generation of spatters, and also increases a degree of freedom in quantitatively setting the melting energy, thereby improving the welding performance.

To improve the welding stability, before the force to push melt pool 6 is provided in the direction opposite to the direction of welding, the distance between wire 2 and melt pool 6 can be set to a predetermined value (for example, in the range of 1 mm to 10 mm) by feeding wire 2 in the backward direction. As described above, in the arc period, the welding current, especially first welding current 14 is required to satisfy both important roles: to generate the force to push melt pool 6 and to melt wire 2. Especially when the distance between the tip of wire 2 and melt pool 6 is short, the concentration of arc 5 increases the electric current density. This results in pushing melt pool 6 locally with a large force, causing part of the pushed melt pool 6 to overflow outside, failing to obtain good weld bead 7. Naturally, in the arc period, the welding current, especially first welding current 14 melts wire 2, increasing the distance between the tip of wire 2 and melt pool 6. The distance, however, can be further increased by feeding wire 2 in the backward direction as in the present first exemplary embodiment. In this case, the entire melt pool 6 can be pushed with arc 5 which expands like an umbrella. This prevents melt pool 6 from overflowing outside, and allows an arc to be formed in a wide range including the front of molten section 8 as shown in FIG. 2B, thereby accelerating the formation of molten section 8 and hence, accelerating zinc vaporization.

In the above description, melt pool 6 is pushed after the distance between wire 2 and melt pool 6 is set to a predetermined value by feeding wire 2 in the backward direction. Alternatively, however, melt pool 6 may be pushed by gradually increasing the welding current while feeding wire 2 in the backward direction.

As shown in the changes in the welding current with time of FIG. 5, droplet 15 has a transfer mode consisting mainly of short-circuit transfer. Immediately after a short circuit occurs, the value of the welding current may be lowered from the value at the time of detection of the short circuit. This method ensures occurrence of a short circuit, thereby suppressing generation of spatters. Furthermore, when the neck of wire 2 is detected immediately before the generation of an arc, the value of the welding current is rapidly lowered from the value immediately before the generation of the arc. In other words, the value of the welding current can be rapidly lowered from the value at the time of detection of the neck so as to suppress generation of spatters at the time of generation of an arc.

As shown in FIG. 1, when torch 1 has an angle of sweepback, the force of arc 5 can push melt pool 6 in the direction opposite to the direction of welding, facilitating the formation of exposed portion 9 shown in FIG. 2B. Especially when the zinc coated steel sheets have a large zinc weight exceeding 100 g/m², the amount of vaporizing zinc increases in proportion to the weight per unit area. In this case, melt pool 6 needs to be pushed in the direction opposite to the direction of welding. Thus, moving melt pool 6 with torch 1 having a sweepback angle can facilitate the release of the vaporized zinc to the outside.

The alternating movement of melt pool 6 between the direction of welding and the opposite direction is greatly affected by the surface tension and viscosity of melt pool 6. When the surface tension and viscosity are too large, it is difficult to move melt pool 6, and exposed portion 9 is not formed. When, on the other hand, the surface tension and viscosity are too small, the force to push melt pool 6 causes melt pool 6 to overflow outside. To avoid these problems, there are appropriate surface tension and viscosity, and one of the casual factors is the shielding gas.

Since $CO_2$ gas has a high content of oxygen ($O_2$), melt pool 6 has an appropriate surface tension and viscosity, both of which increase with increasing Ar ratio. Therefore, preferable examples of the shielding gas include $CO_2$ gas, and a mixture of Ar gas and $CO_2$ gas whose content is in the range of 20% to 90%. In these cases, the molten metal of melt pool 6 has appropriate surface tension and viscosity, thereby suppressing generation of pores such as blowholes and also generation of spatters. Also, it is possible to add a small amount of additive gas to the mixture gas.

Another factor to affect the surface tension and viscosity of melt pool 6 is the type (composition) of wire 2. The inventors of the present invention have experimentally confirmed that when the shielding gas is composed of 100% $CO_2$ gas, excellent surface tension and viscosity can be obtained by using, for example, YGW12 or YGW11.

Melt pool 6 formed by a combination of the shielding gas having the above-mentioned composition ratio and wire 2 may have a moving frequency in the range of 30 Hz to 70 Hz, which can be in sync with a short-circuit frequency, thereby stabilizing the welding process.

Wire 2 may be fed in alternating forward (toward the workpiece) and backward directions, thereby improving the welding performance. In the welding method of the present first exemplary embodiment, the advantages of feeding wire 2 in the backward direction have been described above. At the feed speed in the forward direction, a short circuit can occur more quickly than in the case of feeding the wire at a constant speed as generally performed. This ensures occurrence of a short circuit, thereby suppressing generation of spatters. In the backward direction, on the other hand, a short circuit can be opened mechanically This ensures the opening of a short circuit so as to reduce a short circuit (minor short circuit) that may occur immediately after the short circuit is released, thereby suppressing generation of spatters.

As shown in FIG. 5, the wire may be fed in periodically alternating forward and backward directions at a predetermined frequency WF and at a predetermined amplitude Wv. FIG. 5 shows an example where the wire is fed periodically in the form of a sine wave; alternatively, however, the wire may be fed in the form of a trapezoid or saw tooth as long as the waveform is periodic.

In this method, the wire is fed periodically, allowing the occurrence frequency of a short circuit and an arc to be sync with the wire feeding, thereby improving the periodicity and the stability of the arc.

Although not illustrated, instead of being fed periodically as shown in FIG. 5, the wire may be fed in the backward direction when the welding is detected to be in the short-circuit state, and be fed in the forward direction when the welding is detected to be in the arc state.

In this method, since the feeding of the wire is changed depending on the state of the short circuit and the arc, a short-circuit in any state can be surely opened when the wire extension greatly changes, thereby further improving the arc stability.

According to the present invention, when the surface-treated members such as zinc coated steel sheets are welded together using a welding wire, the melt pool is pushed to expose the overlapped region of these members, and the gas generated from the members is released from the exposed portion. This suppresses generation of pores such as blowholes and also generation of spatters. Therefore, the present invention is useful as a method of welding surface-treated members such as zinc coated steel sheets together that involve gas generation.

What is claimed is:

1. A method of welding surface-treated members by metal coating which are steel sheets including an upper sheet and a lower sheet by using a welding wire, the method comprising:
welding the steel sheets by alternately repeating a short circuit period in which a short circuit between the welding wire and at least one of the steel sheets is generated and an arc period in which an arc having an arc force is generated between the welding wire and the at least one of the steel sheets;
generating a droplet from the welding wire; and
generating a melt pool by transferring the droplet detached from the welding wire to the steel sheets,
wherein said welding the steel sheets comprises:
feeding the welding wire in a backward direction, before or during the arc period, so as to cause a distance between the welding wire and the melt pool to range from 1 mm to 10 mm; and
welding the steel sheets together by pushing the melt pool which is located on an upper surface of the lower plate which is overlapped with the upper plate in a direction opposite to a direction of welding by the arc force of the generated arc in the arc period so that gas generated from the steel sheets is released from a site of generation which is an overlapped region of the upper plate and the lower plate of the steel sheets in such a manner that the overlapped region is exposed by causing a first welding current within a range from 300 A to 600 A which is constant or gradually changes to flow in the welding wire in a predetermined period within the arc period.

2. The method of claim 1, wherein in said welding the steel sheets together, the steel sheets are overlapped with each other, and the melt pool is pushed to expose the overlapped region of the steel sheets.

3. The method of claim 1, wherein in said welding the steel sheets together, the steel sheets are overlapped with each other, and the melt pool is pushed in such a manner that the thickness of the portion of the melt pool which is located on the upper surface of the lower plate which is overlapped with the upper plate becomes, as controlled by the arc force of the generated arc, sufficient to allow the gas generated from the steel sheets to expand and break through the melt pool, thereby being released from the site of generation.

4. The method of claim 1, wherein the predetermined period ranges from 2 msec to 10 msec in the arc period.

5. The method of claim 1, wherein a shielding gas different from a shielding gas for welding is supplied to the melt pool.

6. The method of claim 1, wherein said welding the steel sheets together comprises welding the steel sheets together by pushing the melt pool in the direction opposite to the direction of welding by the arc force in the arc period as to decrease the thickness of the portion of the melt pool which is located on the upper surface of the lower plate which is overlapped with the upper plate in such a manner that gas generated from the steel sheets is released from the site of generation by causing the first welding current to flow in the welding wire in the predetermined period within the arc period after said feeding the welding wire in the backward direction.

7. The method of claim 1, wherein immediately after the short circuit occurs, a value of a welding current is lowered from a value at a time of detection of the short circuit.

8. The method of claim 1, wherein when a neck of the welding wire is detected immediately before generation of an arc, a value of a welding current is lowered from a value at a time of detection of the neck.

9. The method of claim 1, wherein
molten metal of the melt pool has a viscosity sufficient to push the melt pool so as to release the gas generated from the steel sheets during welding; and
the welding wire is made of a material allowing the molten metal of the melt pool to have a viscosity preventing the molten metal from spattering outside when the melt pool is pushed.

10. The method of claim 1, wherein a shielding gas can be either carbon dioxide gas or a mixture of argon gas and carbon dioxide gas whose content is in a range of 20% to 90%.

11. The method of claim 1, wherein the welding wire is fed in periodically alternating forward and backward directions at a predetermined frequency and at a predetermined amplitude.

12. The method of claim 1, wherein instead of being fed periodically, the welding wire is fed in the backward direction when welding is detected to be in a short-circuit state, and in the forward direction when the welding is detected to be in an arc state.

13. The method of either claim 1, wherein an increase slope at which a welding current flowing the welding wire is increased per unit time until reaching the first welding current when carbon dioxide gas is used as a shielding gas is smaller than an increase slope at which a welding current flowing the welding wire is increased per unit time until reaching the first welding current when MAG gas is used as a shielding gas.

14. The method of claim 1, wherein said welding the steel sheets together comprises welding the steel sheets together by pushing the melt pool in the direction opposite to the direction of welding by the arc force as to decrease the thickness of the portion of the melt pool and by pushing the melt pool away from the overlapped region of the steel sheets by the arc force in such a manner that gas generated from the steel sheets is released from the site of generation.

15. The method of claim 1, wherein a welding torch has an angle of sweepback.

16. The method of claim 1, wherein the welding wire is fed at a speed in alternating forward and backward directions.

17. The method of claim 1, wherein the feeding the welding wire in a backward direction, before or during the arc period, comprises feeding the wire in the backward direction, before or during the melt pool is pushed by the arc force of the generated arc in the arc period.

18. The method of claim 1, wherein the melt pool is moved alternately between the direction of welding and the opposite direction and has a moving frequency in the range of 30 Hz to 70 Hz.

19. The method of claim 1, wherein the surface-treated members by metal coating are zinc coated steel sheets which have a zinc weight exceeding 100 g/m$^2$.

* * * * *